United States Patent
Karetta et al.

(10) Patent No.: US 7,231,788 B2
(45) Date of Patent: Jun. 19, 2007

(54) METHOD AND DEVICE FOR REFINING A GLASS MELT USING NEGATIVE PRESSURE

(75) Inventors: Frank Karetta, Dittelsheim-Hessloch (DE); Joerg Witte, Darmstadt (DE); Klaus-Dieter Duch, Taunusstein (DE); Dirk Gohlke, Meerscbuch (DE); Wolfgang Muench, Bubenheim (DE); Allen Jakway, Mainz (DE); Rainer Eichholz, Mainz (DE); Frank-Thomas Lentes, Bingen (DE)

(73) Assignee: Schott AG, Mainz (DE)

( * ) Notice: Subject to any disclaimer, the term of this patent is extended or adjusted under 35 U.S.C. 154(b) by 554 days.

(21) Appl. No.: 10/415,772

(22) PCT Filed: Oct. 23, 2001

(86) PCT No.: PCT/EP01/12197

§ 371 (c)(1),
(2), (4) Date: Oct. 23, 2003

(87) PCT Pub. No.: WO02/36509

PCT Pub. Date: May 10, 2002

(65) Prior Publication Data
US 2005/0097922 A1    May 12, 2005

(30) Foreign Application Priority Data
Nov. 6, 2000 (DE) ............................... 100 54 881
Jun. 13, 2001 (DE) ............................... 101 28 674

(51) Int. Cl.
  C03B 5/225   (2006.01)
  C03B 5/167   (2006.01)
  C03B 5/43    (2006.01)
(52) U.S. Cl. .................. 65/134.2; 65/134.9; 65/135.1; 65/157; 65/346; 65/374.12

(58) Field of Classification Search ............... 65/134.1, 65/134.2, 134.9, 135.1, 135.6, 136.4, 157, 65/346, 355, 356, 374.1, 374.11, 374.12, 65/DIG. 4, DIG. 13
See application file for complete search history.

(56) References Cited

U.S. PATENT DOCUMENTS
1,598,308 A   8/1926   Pike (Continued)

FOREIGN PATENT DOCUMENTS
DE         33 20 980   * 12/1984

(Continued)

OTHER PUBLICATIONS

Patent Abstracts of Japan vol. 14, No. 531, Nov. 21, 1990 & JP 02 221129 A, Sep. 4, 1990.

(Continued)

*Primary Examiner*—Eric Hug
(74) *Attorney, Agent, or Firm*—Michael J. Striker

(57) ABSTRACT

The apparatus for reduced-pressure refining of a glass melt includes a refining bank formed so that a reduced pressure is generated by a glass flow in it. The refining bank has a component, which is made from a refractory metal or refractory alloy acting as glass-contact material. The refractory metal or alloy contains molybdenum, tungsten, tantalum, and/or hafnium. The device of the present invention includes a protective gas reservoir for a protective gas and an automatically operating valve connecting the reservoir with the refining bank so that an inner side of the component that would otherwise be exposed when a pressure rise or a falling glass melt column occurs is protected from oxidation by the protective gas. A process for using the device during refining of the glass melt is also part of the invention.

28 Claims, 2 Drawing Sheets

U.S. PATENT DOCUMENTS 3,519,412 A      7/1970  Olink
4,351,664 A *    9/1982  Bansal ........................ 65/128
6,460,376 B1 *  10/2002  Jeanvoine et al. ......... 65/134.2

FOREIGN PATENT DOCUMENTS

| | | | |
|---|---|---|---|
| DE | 33 20 980 A | | 12/1984 |
| EP | 0 908 417 A2 | | 4/1999 |
| EP | 0 918 417 | * | 4/1999 |
| GB | 172 610 A | | 9/1922 |

OTHER PUBLICATIONS

Patent Abstracts of Japan vol. 2000, No. 06, Sep. 22, 2000 & JP 2000 086249 A, Mar. 28, 2000.

Patent Abstracts of Japan vol. 2000, No. 12, Jan. 3, 2001 & JP 2000 247647 A, Sep. 12, 2000.

Database WPI, Section Ch, Week 16, Derwent Publications Ltd., London, GB, AN 1998-177524 XP 002188856 & RU 2 087 428 A, Aug. 20, 1997.

* cited by examiner

METHOD AND DEVICE FOR REFINING A GLASS MELT USING NEGATIVE PRESSURE

CROSS-REFERENCE

This is the U.S. National Stage of PCT/EP 01/12197, filed Oct. 23, 2001, which, in turn, claims the benefit of priority of invention under 35 U.S.C. 119 (a) and 35 U.S.C. 365 (b) based on DE 100 54 881.4 filed Nov. 6, 2000 in Germany and based on DE 101 28 674.0 filed Jun. 13, 2001 in Germany.

BACKGROUND OF THE INVENTION

The invention relates to a process and device for the reduced-pressure refining of a glass melt using a reduced-pressure apparatus, in which the glass melt is fed to a refining bank via a riser and is discharged again from the refining bank via a downpipe, a reduced pressure being generated by means of the glass flow in the refining bank.

The refining of the glass melt, i.e. the removal of gas bubbles from the glass melt, is used to eliminate bubbles. With small crucible melts, the rise of the gas bubbles out of the glass melt has already been accelerated by means of the application of a reduced pressure above the glass melt.

Devices for reduced-pressure refining of a glass melt using a reduced-pressure apparatus of the type mentioned in the introduction are known, for example, from documents U.S. Pat. No. 1,598,308, EP 0 908 417 A2 and JP 2-2211229 A. The first two of these documents disclose the use of ceramic refractory materials as glass-contact material, while the last of these documents discloses the use of platinum or platinum alloys as glass-contact material.

Both the use of ceramic refractory materials and the use of platinum and its alloys are associated with a range of drawbacks.

For example, ceramic refractory materials, when in contact with a glass melt, are subject to considerable wear and increased corrosion compared to platinum and its alloys. This entails firstly short plant operating times and a high outlay on maintenance and repair and secondly a high potential for the formation of glass defects (formation of cords, inclusions, bubbles in particular in the downpipe). Furthermore, heating presents problems for glass melts which cannot be heated directly by electrical means or can only be heated in this way with difficulty.

With regard to the formation of glass defects, it is preferable to use platinum or platinum alloys, but the capital costs which this incurs are very high.

SUMMARY OF THE INVENTION

Therefore, it is an object of the invention to provide a device and a process for the reduced-pressure refining of a glass melt in which the drawbacks mentioned in the introduction are overcome. With regard to contact with the glass melt which is to be refined, the device is to be corrosion-resistant and wear-resistant, is to bellow-maintenance and is to have the minimum possible procurement and operating costs. Furthermore, it is to be possible to heat the glass melt inside the device, in particular inside the riser and downpipe.

This object is achieved when the device for the reduced-pressure refining of a glass melt using a reduced-pressure apparatus in which the glass melt is fed to a refining bank via a riser and is discharged again from the refining bank via a downpipe, a reduced pressure being generated by means of the glass flow in the refining bank, is designed in such a manner that the riser and/or the downpipe and/or the refining bank comprises at least one component made from at least one refractory metal and/or from a refractory metal alloy acting as glass-contact material.

In the process according to the invention for the reduced-pressure refining of a glass melt in a reduced-pressure apparatus, in which the glass melt is fed to a refining bank via a riser and is discharged again from the refining bank via a downpipe, a reduced pressure is generated by means of the flow of glass in the refining bank, and the riser and/or the downpipe and/or the refining bank are provided with at least one component made from at least one refractory metal and/or from a refractory metal alloy as glass-contact material.

Since the riser and/or the downpipe and/or the refining bank has at least one component made from at least one refractory metal and/or refractory metal alloy as glass-contact material, it is possible to satisfy the requirements which were described when the objectives were being set.

It has been possible to determine that components made from molybdenum, tungsten, tantalum or hafnium or from an alloy which contains at least one of these refractory metals satisfy the abovementioned demands imposed on the device for reduced-pressure refining particularly well. Tantalum and hafnium and alloys thereof in particular form oxidic protective layers with a low vapor pressure.

To protect the components—refractory metals and their alloys are generally oxidized considerably at temperatures of over 500° C. in the presence of oxygen—that side of the components which is remote from the glass melt is preferably flushed with a protective gas (e.g. nitrogen, noble gas) or forming gas (hydrogen/nitrogen, noble gas), or alternatively the side remote from the glass melt is protected from oxidation by glazing, for example by a deliberate flow of the glass melt behind the components. By contrast, that side of the components which is in contact with the glass melt is sufficiently protected by the melt while the device is operating. For the flushing, at least the component is located in a housing which has a feed for the protective gas or forming gas and a corresponding discharge. The hydrogen content of the forming gas may be up to 100%.

To ensure optimum operation of the device, the components are of vacuum-tight design and are preferably also designed to be mechanically stable with respect to pressure differences.

In a particularly preferred embodiment of the device, the components comprise individual sections, in particular pipe sections, which are connected to one another by means of a flange connection or a screw connection. Pipe sections can be produced and processed further easily and inexpensively from refractory metals or their alloys. The connections between the pipe sections can be made gas-tight in a particularly simple way by means of cutting edges. An additional sealing action is achieved if the pipe sections which have been connected to one another are annealed, preferably at temperatures of over 1000° C., during which step the contact locations are welded or sintered together.

The cutting edge seal is a static connection which is free of sealing material. It is used here to connect rotationally symmetrical pipe sections. To increase the pressure, at in each case one of the pipe pairs which are to be connected the sealing surface (planar bearing surface) is reduced in size in such a manner that concentrically encircling cutting edges which are V-shaped in cross section are formed. When the connecting locations are clamped together, the pressure on the cutting edges is increased to such an extent that, if necessary, the material can flow.

As has already been mentioned, the component is preferably located in a housing, in particular in a gas-tight housing, with the thermal expansion of the component with respect to the housing being compensated for, for example by a spring-assisted bellows which is preferably part of the housing. The inner components which carry glass melts are subject to higher temperatures than the surrounding parts and accordingly expand to a greater extent.

The gas pressure inside the housing should be slightly increased compared to atmospheric pressure. If a reduced pressure prevails in the housing, there is the risk of an explosive mixture with the forming gas being formed as a result of air being sucked in through leaks. Air being sucked in would also lead to considerable oxidation of the component on the rear side. However, this means that the component must additionally have a high mechanical stability in order to be able to withstand (bear) the pressure difference (slightly increased pressure on the outer side, reduced pressure on the inner side). Also, all the connections must be designed to be gas-tight. Since a slight excess pressure is used in the gas space, it is imperative that no protective gases pass into the glass melt. This would lead to the formation of glass defects (formation of gas bubbles in the glass, reduction of glass constituents in the case of hydrogen-containing protective gas).

Furthermore, it is advantageous if the component can be heated. Particularly in the case of devices for reduced-pressure refining of glass melts which have a high surface to volume ratio of the glass melt and/or a low flow rate and therefore a high dissipation of heat to the environment, it is necessary for the glass melt to be additionally heated. In this context, one possible option is heating by means of radiation heaters (e.g. grids of refractory metal or alloys thereof, e.g. of molybdenum, tungsten, tantalum or hafnium), the radiation heaters—since they reach surface temperatures of up to 2200° C. during operation—if necessary being protected against oxidation by being flushed with a protective gas or forming gas or by glazing in a similar manner to the components.

Furthermore, the heating of the components may also be effected by induction or by direct flow of high-frequency alternating current in the component. Heating by means of direct flow of current in the glass melt using a central stick electrode and the component as a counterelectrode is also advantageous in particular if the glass melt has a sufficient electrical conductivity.

In order, in particular in the event of a pressure rise or a drop in the glass melt column, for the inner side of the component—which is then no longer covered by the glass melt—to be protected from oxidation, the device can be at least partially flooded with a protective gas. In this case, there is in particular a connection to a protective-gas reservoir for flooding the device with a protective gas, in particular an automatic connection, for example a valve which opens automatically when required.

BRIEF DESCRIPTION OF THE DRAWING

The invention is to be explained in more detail with reference to the following exemplary embodiments and drawings, in which.

DESCRIPTION OF THE PREFERRED EMBODIMENTS

Figure 1:
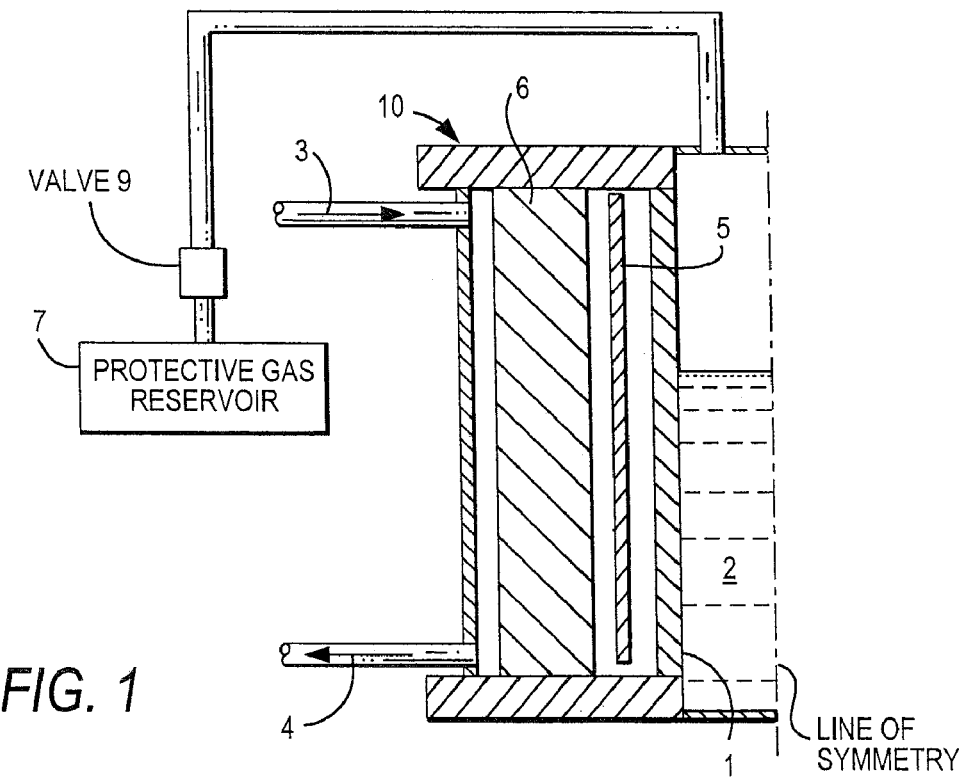
FIG. 1 shows a detailed view of a device according to the invention for reduced-pressure refining with radiation heaters.

FIG. 1 shows part of a device according to the invention for the reduced-pressure refining of a glass melt using a reduced-pressure apparatus in which the glass melt (2) is fed to a refining bank via a riser and is discharged again from the refining bank via a downpipe, a reduced pressure being generated by means of the glass flow in the refining bank and the riser and/or the downpipe and/or the refining bank having at least one component (1) made from at least one refractory metal and/or from a refractory metal alloy as glass-contact material.

The component (1), which is of tubular design and is preferably made from molybdenum or tungsten or a corresponding alloy, is surrounded by a housing (10) (e.g. made from steel, aluminum or plastic). The feed (3) and discharge (4) for the protective gas or forming gas are also located in the housing.

On the side remote from the glass melt, the component (1) is protected from oxidation by flushing with a protective gas or forming gas, and the radiation heater (5) is also protected.

Refractory material (6) is located between the radiation heaters (5) and the housing. The role of the refractory material is firstly to minimize the heat losses and secondly to reduce the temperature to such an extent that the housing material is not damaged. Under certain circumstances, for this purpose individual regions are to be provided with cooling, for example water cooling. Lead-throughs (not shown), which enable the protective gas to flow to and from the component and the radiation heaters, are provided in the refractory material.

The radiation heaters are arranged around the component in such a way that they can directly irradiate or heat the component. The electrical feeds to the heaters are protected against the high temperatures (e.g. by water cooling and by screening the radiation).

Figure 2:
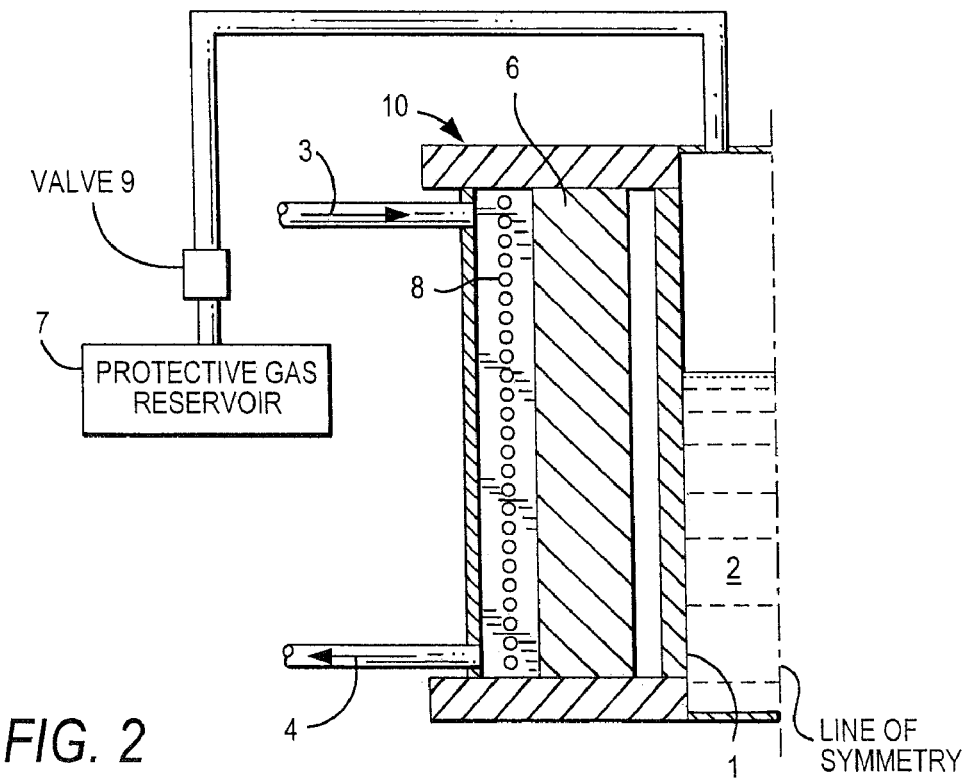
FIG. 2 shows a detailed view of a device according to the invention for reduced-pressure refining with inductive heating.

FIG. 2 likewise shows a detailed view of a further device according to the invention. In this case too, a refractory material (6) is arranged around a tubular component (1), with a gap-through which the protective gas or forming gas can flow remaining between the component and insulation. The induction coil (8) (which may be water-cooled and/or additionally thermally insulated) for inductive heating of the component is arranged in the cooler region between the housing and the insulation.

Figure 3:
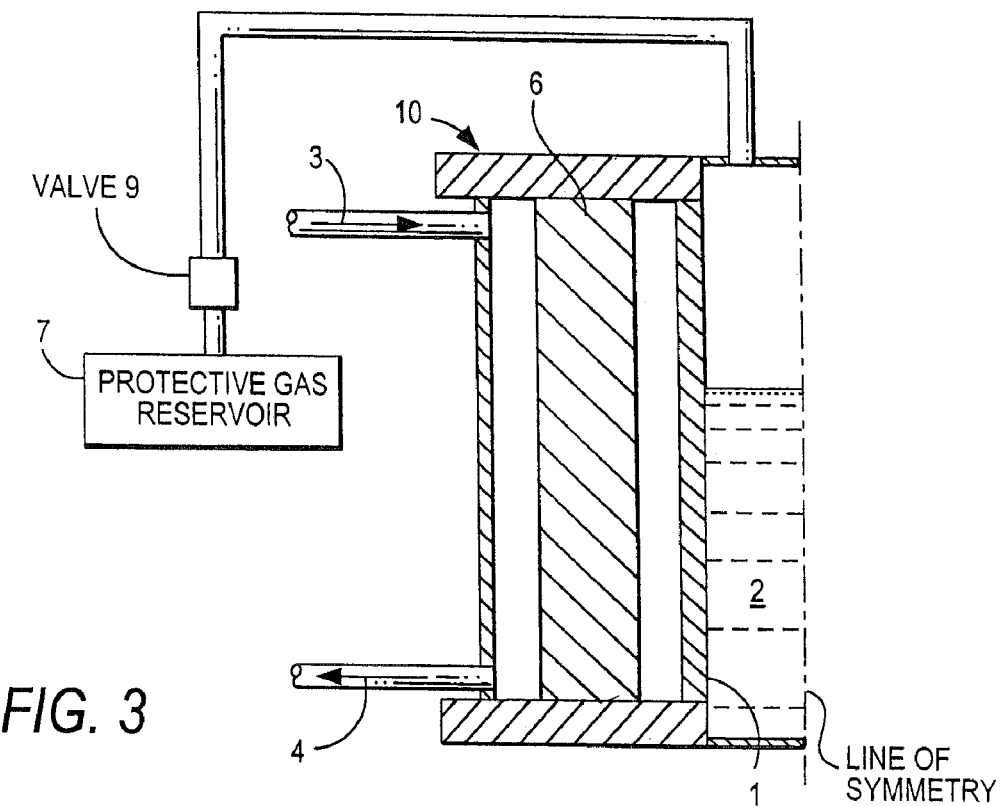
FIG. 3 shows a detailed view of a device according to the invention for reduced-pressure refining with direct electrical heating of the glass melt.

FIG. 3 likewise shows a detailed view of part of a device according to the invention, the glass melt (2) being heated by means of direct electrical heating using a central stick electrode (12) and the component (1) as a counterelectrode. In this embodiment, the heating is effected by means of the flow of current in the glass melt. Unlike the standard structure of electrode heating circuits, however, in this case the heating circuit length is very short on account of the arrangement comprising the central stick electrode and the component as a counterelectrode, so that even glass melts with a poor electrical conductivity can still be heated using acceptable voltages.

Figure 4:
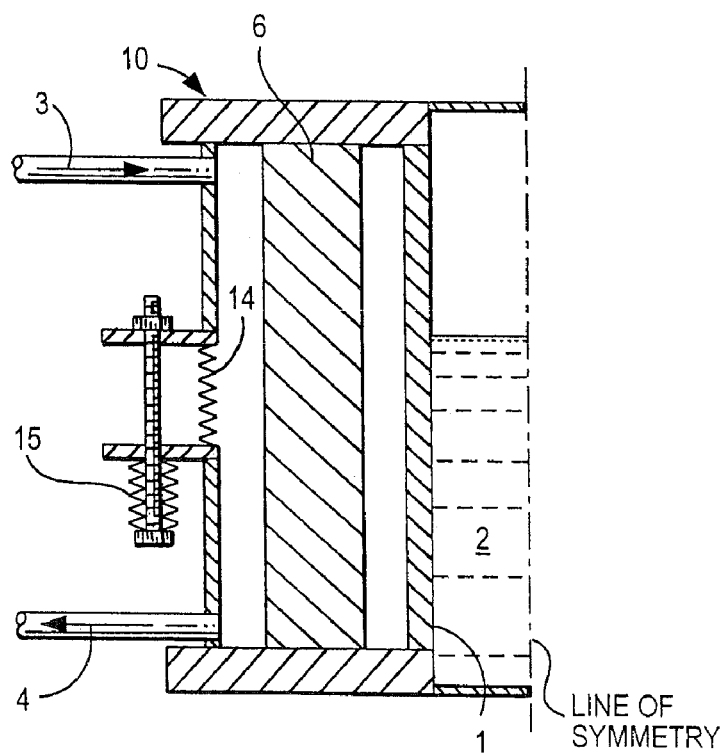
FIG. 4 shows a detailed view of a device according to the invention for reduced-pressure refining with spring-assisted bellows for compensating for the thermal expansions.

The thermal expansion of the component with respect to the housing is compensated for, as shown in FIG. 4, by means of a spring-assisted (15) bellows (14) which is part of the housing.

On account of the low electrical resistance of metals, direct electrical heating of a component provided in accordance with the invention using alternating current at normal mains frequency (50 or 60 Hz) is generally not practical, on account of the high currents required. However, at high alternating current frequencies what is known as the skin effect occurs, causing the current to flow only in a thin layer (skin) at the outer edge of the tube. This is associated with an increase in the electrical resistance, and consequently the current required is correspondingly lower. This means that direct electrical heating of the tube is practical again.

The structure of direct electrical heating of this type corresponds to that shown in FIG. 2, but without an induction coil, or to the structure shown in FIG. 3, but without a stick electrode. The electrical resistance to direct current for a tubular component with an external diameter of 300 mm rises by approximately a factor of 21 at an alternating current frequency of 10 kHz and by approximately a factor of 67 at an alternating current frequency of 100 kHz.

The components have to be reliably protected against oxidation both when the installation is being started up and in emergency situations. When the installation is first being started up, the components can be incorporated coated on the inner side with a commercially available oxidation-resistant coating (e.g. SIBOR produced by PLANSEE). During operation, this coating dissolves in the glass melt. Another possibility consists in the empty volume in the installation being filled with an inert gas (noble gases, nitrogen) or a reducing atmosphere (e.g. by admixing hydrogen).

In the event of a pressure rise (whether unintended or deliberate) in the refining bank, causing the glass column to drop to such an extent that the components are no longer protected from oxidation by the glass melt, other measures have to be used to protect the component. This can be achieved by flooding the installation with inert gas or a reducing atmosphere. If the pressure rise is brought about deliberately, this can be controlled directly via the protective gas inlet.

If the pressure rise is unforeseen (e.g. as a result of a pump failure), the installation must be flooded automatically, for example by a solenoid valve (9), which opens automatically and connects the refining bank to a protective gas reservoir (7).

The invention claimed is:

1. A device for reduced-pressure refining of a glass melt using a reduced-pressure apparatus in which the glass melt is fed to a refining bank via a riser and is discharged again from the refining bank via a downpipe so that a reduced pressure is generated by a glass flow in the refining bank, wherein said refining bank, said riser, and/or said downpipe comprises at least one component, said at least one component is made from a refractory metal or a refractory metal alloy acting as glass-contact material, and said refractory metal or said refractory metal alloy contains at least one of said molybdenum, said tungsten, said tantalum, and said hafnium;
wherein said device comprises a protective gas reservoir and an automatic connection for connecting said protective gas reservoir to supply a protective gas to protect an inner side of said at least one component from oxidation in the event of a pressure rise or in the event of a falling glass melt column.

2. The device as defined in claim 1, wherein said automatic connection comprises an automatically operable valve that automatically opens in response to said pressure rise or in response to said falling glass melt column so that said protective gas is automatically supplied to protect said inner side of said at least one component.

3. The device as defined in claim 1, wherein said at least one component consists of said refractory metal.

4. The device as defined in claim 1, wherein said at least one component comprises said tantalum or said hafnium.

5. The device as claimed in claim 1, wherein a side of said at least one component remote from another side of the at least one component contacted by said glass melt is protected by purging with said protective gas or a forming gas.

6. The device as claimed in claim 1, further comprising glazing a side of said at least one component remote from the glass melt in order to protect said at least one component from oxidation.

7. The device as claimed in claim 1, wherein said at least one component is of a vacuum-tight design.

8. The device as claimed in claim 1, wherein said at least one component is mechanically stable with respect to pressure differences.

9. The device as claimed in claim 1, wherein said at least one component comprises individual pipe sections and said individual pipe sections are connected to one another by a flange connection or a screw connection.

10. The device as claimed in claim 9, wherein said flange connection or said screw connection is made gas-tight by means of cutting edges.

11. The device as claimed in claim 9, wherein said individual pipe sections connected to one another are annealed at high temperatures, so that contact locations between the pipe sections are welded or sintered together.

12. The device as claimed in claim 1, wherein said at least one component is located in a housing.

13. The device as claimed in claim 12, wherein said housing is gas-tight.

14. The device as claimed in claim 12, further comprising means for compensating for thermal expansion of said at least one component with respect to said housing.

15. The device as claimed in claim 14, wherein said means for compensating for thermal expansion comprises a spring-assisted bellows and said housing comprises said spring-assisted bellows.

16. The device as claimed in claim 1, further comprising means for heating said at least one component.

17. The device as claimed in claim 16, wherein said means for heating said at least one component comprises at least one radiation heater.

18. The device as claimed in claim 17, wherein said at least one radiation heater is protected from oxidation by flushing said at least one radiation heater with said protective gas or a forming gas.

19. The device as claimed in claim 17, wherein said at least one radiation heater is protected from oxidation by glazing.

20. The device as claimed in claim 16, wherein said means for heating comprises means for inductive heating said at least one component.

21. The device as claimed in claim 16, wherein said means for heating said at least one component comprises means for passing a high-frequency alternating current through said at least one component.

22. The device as claimed in claim 16, wherein said means for heating said at least one component comprises means for providing a direct flow of current in said glass melt between a central stick electrode and said at least one component, wherein said at least one component acts as counter electrode.

23. A process for reduced-pressure refining of a glass melt in a reduced-pressure apparatus comprising a refining bank for the glass melt, a riser for supplying the glass melt to the refining bank, and a downpipe for discharge of the glass melt from the refining bank, wherein said refining bank, said riser, and/or said downpipe comprises at least one component made from at least one refractory metal or a refractory metal alloy acting as glass-contact material, said at least one refractory metal is selected from the group consisting of molybdenum, tungsten, tantalum, and hafnium, and said refractory metal alloy contains at least one of said molybdenum, said tungsten, said tantalum, and said hafnium, so that said at least one component contacts the glass melt; said process comprising the steps of:

a) feeding a glass melt to be refined to the refining bank via the riser;

b) generating a reduced pressure in the refining bank by means of a glass flow in the refining bank; and c) supplying a protective gas from a protective reservoir via an automatic connection to protect an inner side of the at least one component from oxidation when a pressure rise or a fall of a glass melt column occurs.

24. The process as defined in claim 23, wherein said refining bank includes said at least one component and said automatic connection comprises an automatically opening valve that opens to supply said refining bank with said protective gas in the event of said pressure rise or said fall of the glass melt column.

25. The process as defined in claim 23, wherein said protective gas comprises an inert gas or a reducing gas.

26. The process as defined in claim 23, wherein said at least one component consists of said refractory metal.

27. The process as defined in claim 23, further comprising heating said at least one component during said refining.

28. The process as defined in claim 27, further comprising compensating for thermal expansion of said at least one component during said heating.

* * * * *